US012602454B2

(12) United States Patent
Fieau et al.

(10) Patent No.: US 12,602,454 B2
(45) Date of Patent: Apr. 14, 2026

(54) METHOD FOR COLLABORATIVE MANAGEMENT OF LICENSES ACROSS INDUSTRIAL SECTORS

(71) Applicant: Orange, Issy-les-Moulineaux (FR)

(72) Inventors: Frédéric Fieau, Chatillon (FR); Gaël Fromentoux, Chatillon (FR); Emile Stephan, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 44 days.

(21) Appl. No.: 18/003,884

(22) PCT Filed: Jun. 25, 2021

(86) PCT No.: PCT/FR2021/051172
§ 371 (c)(1),
(2) Date: Dec. 29, 2022

(87) PCT Pub. No.: WO2022/003282
PCT Pub. Date: Jan. 6, 2022

(65) Prior Publication Data
US 2023/0267180 A1       Aug. 24, 2023

(30) Foreign Application Priority Data
Jun. 29, 2020    (FR) ...................................... 2006826

(51) Int. Cl.
*G06F 21/10*       (2013.01)
*H04L 12/28*       (2006.01)
(Continued)

(52) U.S. Cl.
CPC ........ *G06F 21/105* (2013.01); *G06F 21/1012* (2023.08); *G06F 21/108* (2023.08);
(Continued)

(58) Field of Classification Search
CPC . G06F 21/105; H04W 36/12; H04W 36/0022; H04W 36/0016; H04L 12/2818
See application file for complete search history.

(56) References Cited

U.S. PATENT DOCUMENTS

| | | | | |
|---|---|---|---|---|
| 10,841,152 B1 * | 11/2020 | Humphreys | ............ | H04L 67/10 |
| 2002/0162002 A1 * | 10/2002 | Gunter | .................... | G06F 21/33 |
| | | | | 713/176 |

(Continued)

FOREIGN PATENT DOCUMENTS

| | | |
|---|---|---|
| WO | WO 2015/019416 A1 | 2/2015 |
| WO | WO 2018/166398 A1 | 9/2018 |

OTHER PUBLICATIONS

Gemalto N V. "IFA034 LM scope in NFV-MANO", vol. WG NFV IFA Interfaces and Architecture, Nov. 27, 2018, pp. 1-8, ETSI Draft; NFVIFA(18)000926R1, European Telecommunications Standards Institute (ETSI), 650, Route Des Lucioles; F-06921 Sophia-Antipolis; France.

(Continued)

*Primary Examiner* — William R Korzuch
*Assistant Examiner* — Aditya Sriram
(74) *Attorney, Agent, or Firm* — Knobbe, Martens, Olson & Bear, LLP

(57) ABSTRACT

A method for managing licenses for a service application across a plurality of interconnected industrial sectors. The method includes: selecting a delegation policy; deploying a local virtual license manager in one of the two industrial sectors, and sending a license authorizing the local virtual license manager to use the service application, in particular for executing a command of a cyber-physical system.

12 Claims, 4 Drawing Sheets

(51) Int. Cl.
    *H04W 36/00*       (2009.01)
    *H04W 36/12*       (2009.01)

(52) U.S. Cl.
    CPC ..... *H04L 12/2818* (2013.01); *H04W 36/0016*
         (2013.01); *H04W 36/0022* (2013.01); *H04W*
                                 *36/12* (2013.01)

(56)              References Cited

U.S. PATENT DOCUMENTS

| | | |
|---|---|---|
| 2003/0236820 A1 | 12/2003 | Tierney et al. |
| 2010/0031033 A1 | 2/2010 | Kim et al. |
| 2016/0205216 A1 | 7/2016 | Rogel et al. |
| 2018/0113999 A1* | 4/2018 | Azmat ................. G06F 21/105 |
| 2019/0058768 A1* | 2/2019 | Feijoo ................. H04L 67/1001 |
| 2020/0065005 A1 | 2/2020 | Kripalani et al. |
| 2020/0099591 A1 | 3/2020 | Clarke |
| 2020/0349239 A1* | 11/2020 | Tyagi .................... G06F 21/105 |
| 2021/0126840 A1* | 4/2021 | Venkataramu ...... H04L 41/0806 |
| 2022/0104077 A1* | 3/2022 | Jarschel ............ H04W 36/0016 |
| 2022/0116134 A1* | 4/2022 | Yu ......................... H04W 40/36 |

OTHER PUBLICATIONS

International Search Report for International Application No. PCT/FR2021/051172, dated Oct. 4, 2021.

\* cited by examiner

METHOD FOR COLLABORATIVE MANAGEMENT OF LICENSES ACROSS INDUSTRIAL SECTORS

CROSS-REFERENCE TO RELATED APPLICATIONS

This application is filed under 35 U.S.C. § 371 as the U.S. National Phase of Application No. PCT/FR2021/051172 entitled "METHOD FOR COLLABORATIVE MANAGE-MENT OF LICENCES ACROSS INDUSTRIAL SEC-TORS" and filed Jun. 25, 2021, and which claims priority to FR 2006826 filed Jun. 29, 2020, each of which is incorporated by reference in its entirety.

BACKGROUND

Field of Disclosure

This description relates to the field of industrial networks, and more specifically to methods for managing licenses in a collaborative manner across multiple industrial sectors or networks.

Description of Related Technology

The fields of health, transport, energy, and industry are becoming major sectors in the use of 5G standards in telecommunications. These 5G standards will considerably improve the speeds, connectivity, latency, and reliability of communications in the industrial production sector, known as "Industry 4.0", for example to control connected devices, to drive cyber-physical systems such as an industrial robot, to coordinate several machine tools, or to send and share data or services in a secure manner between different operators.

In this context, one difficulty encountered is the ability to have infrastructures that satisfy the constraints required by secure inter-sector collaborations. In particular, the infrastructures of known industrial data spaces must meet increasingly demanding requirements in terms of data security, robustness, latency, and digital sovereignty.

These requirements must take into account common rules, which may be restrictive, for several partners cooperating with each other. Such common rules are important for sharing the use of common systems between different contracting parties, while guaranteeing a level of security that meets the requirements of each of these parties.

These infrastructures should ideally be able to provide real-time control solutions for integrated production processes, heterogeneous storage and processing solutions for production data, and secure collaboration solutions concerning the protection of public or private data.

However, the known methods have several disadvantages.

Indeed, industrial sectors, and in particular the network architectures comprised in these industrial sectors, do not provide an optimal way to share, control, and manage service application licenses between different industrial sectors.

For example, communication service providers are increasingly using Virtual Network Functions (VNFs) to enhance their product offerings for the deployment of cutting-edge telecommunications and computing services. These VNFs are software entities providing service applications that can be deployed quickly in different networks, and present rules and conditions for their access or use that are set by their providers. In particular, their access or usage rights, subject to payment, are governed by these same providers, which requires the establishment of mechanisms to monitor compliance with these rules and conditions.

However, the increasing decentralization of network components also leads to a growing increase in the data traffic associated with the management and implementation of these licenses.

In particular, it is currently not possible to manage licenses across several interconnected industrial sectors while minimizing the excess traffic and the latency time induced by such management.

This is particularly problematic in the context of collaborative management of licenses across multiple industrial sectors when a large number of industrial sectors are concerned or when these industrial sectors have different capabilities or levels of security.

There is therefore a need to improve the methods for managing licenses for service applications, and therefore for managing the access or usage rights for these service applications.

SUMMARY

In order to respond to this or these disadvantages, a first object proposed herein is a method for managing licenses for a service application across a plurality of interconnected industrial sectors, the method comprising the steps of:

selecting, with a first industrial sector among the plurality of industrial sectors, a policy for delegating the service application to a second industrial sector among the plurality of industrial sectors;

deploying, from the first industrial sector into the second industrial sector, a local virtual license manager; and sending a license for the service application from the first industrial sector to said local virtual license manager, the license authorizing the use of the service application by the second industrial sector.

Herein, a service application is an application configured to perform a service within an industrial sector, for example an environmental condition management service, an inter-terminal communication service, a data or physical measurements collection service, a service for sharing information across industrial sectors, a service for controlling a cyber-physical system such as a robotic machine, etc. A service application is for example a virtual network function, hereinafter called a virtualized function or virtual function VNF.

Herein, a virtualized or virtual function is typically provided by a provider, for example an industrial data space, and is defined as comprising a set of software components that are executable on a server such as a virtual machine (VM) or a container.

Examples of virtualized functions include edge functions such as SD-WAN, vCPE, or IP Edge; switching or routing functions such as BNG or CG-NAT; gateway functions such as VPN or SSL; traffic analysis (DPI) or quality measurement (QoE) functions; signaling functions; policy control functions; or security functions such as firewalls, intrusion detection systems, virus detectors, etc.

Herein, a license for a service application is a temporary right granted by a provider of this service application to a third party, and authorizes the third party to access or use this service application. Optionally, this license may also authorize the third party to access the data collected via this service application and/or to use this service application to trigger an action or an event remotely.

Herein, in particular, a license may be defined according to the rules and conditions of use of the service application for which it grants rights, for example a right to use a corresponding virtual function VNF. A licensed third party can use this service application as long as they comply with the rules and conditions set by the service application provider.

The first object herein enables direct collaboration across different industrial sectors via the deployment of an optimal delegation and management system for service application licenses, this system minimizing latency and data traffic between these industrial sectors.

The delegation management makes it possible to extend the sector of use to another player, here the second industrial sector, and concerns the control and the extension of usage rights to the service application by the first industrial sector.

Advantageously, this allows implementing a direct, collaborative, fast, and secure management of service application licenses across a plurality of sectors. In addition, this management is configurable according to a governance framework which may be predefined by the service application provider, and allows guaranteeing continuous control of these licenses.

Herein, a delegation policy includes a set of rules defining remote access to the service application, these rules possibly dependent on collaboration parameters across several industrial sectors. Such rules include, for example, a delegation protocol associated with this delegation policy, a priority of use, a configuration constraint, a delegation duration, a network connectivity constraint, or a security parameter.

Herein, the delegation policy includes, for example, a delegation protocol selected among an ACME/STAR protocol, a PKCS #11 protocol, a SubCerts protocol, or a LURK protocol.

In a preferred embodiment, the deployment of the local virtual license manager is implemented via a secure communication channel, the method further comprising configuring, according to the selected delegation policy, said secure communication channel being established between a first secure connector of the first industrial sector and a second secure connector of the second industrial sector.

This makes it possible to implement an interface and an interoperability between the two industrial sectors, the exchange of data between them being governed by well-defined governance rules.

Advantageously, the level of security of the secure communication channel thus established and/or configured, and therefore of the data exchanged therein, can be adapted to circumstances, and for example according to governance rules, the license sent, the selected delegation policy, the availability of the secure communication channel, the reliability of the secure communication channel, or even its type, fixed or cellular.

In another possible embodiment, the selection of the delegation policy and/or the configuration of the secure communication channel is implemented upon establishment of a collaboration agreement between the first and second industrial sectors, and/or upon the reception, from an industrial data space, of a service application access request, a service application usage request, or a service application license request.

Herein, the industrial data space is a proprietary system of the service application, suitable for providing the service application and a license for it.

In a preferred embodiment, the sending of the license for the service application to the local virtual license manager includes providing the license to the first secure connector and/or to the second secure connector.

This ensures that the sending of the license between several industrial sectors is implemented via the communication channel between the two. In addition, the presence of the license on at least one of the two secure connectors makes it possible to verify it at at least one of the ends of the communication channel, after deployment of the local virtual license manager or before any other subsequent operation involving the license.

In one possible embodiment, the providing of the license is implemented from the license manager of the first industrial sector, to the first secure connector.

In one variant of this possible embodiment, the providing of the license is implemented from the license manager of the second industrial sector, to the second secure connector.

In a preferred embodiment, the configuration of the secure communication channel includes an updating of the second secure connector relative to the first secure connector.

In one possible embodiment, the updating of the second secure connector includes an activation of at least one virtual function common to the first and second industrial sectors.

For example, this common virtual function is configured to allow secure collaboration between the two industrial sectors, the securing of this collaboration being permitted by sharing keys and/or certificates specific to the two secure connectors and authorizing them to collaborate.

This makes it possible to guarantee that the level of compliance and/or security of the second industrial sector with regard to accessing and/or using the service application by means of the license sent is sufficient in comparison to the level of compliance and/or security of the first industrial sector.

If such is not the case, for example when the compliance parameter of the second industrial sector verified in comparison to the first industrial sector is not of sufficient level, the first secure connector may for example inform the second secure connector of functions that can be activated by the second industrial sector, activation of these functions making it possible to achieve the desired level of compliance and/or security. Information about keys or certificates may also be provided in a similar manner.

In a preferred embodiment, the service application is configured to control a cyber-physical system of the first industrial sector, the method further comprising, upon reception of the license by the local virtual license manager, executing a command of the cyber-physical system by means of the service application.

This extends the footprint of an industrial sector by allowing remote control of a cyber-physical system from another industrial sector that is licensed for the service application. Ad hoc delegation is carried out via the communication established by means of the two secure connectors between the two industrial sectors, such that the second industrial sector leases a cyber-physical system from the first industrial sector, the license management associated with this lease being implemented via the local virtual license manager.

In one possible embodiment, execution of the command of the cyber-physical system is implemented by the local virtual license manager.

In one possible embodiment, execution of the command of the cyber-physical system is implemented upon reception, by the first industrial sector, of a message of approval issued by the local virtual license manager of the second industrial sector.

In one possible embodiment, execution of the command of the cyber-physical system is implemented upon reception of the message of approval by the cyber-physical system of the first industrial sector.

In a preferred embodiment, execution of the command of the cyber-physical system is implemented in an exchange, between the first industrial sector and the local virtual license manager of the second industrial sector, of a license request-response pair.

This makes it possible to implement the execution of the command of the cyber-physical system on the basis of a direct communication between the first industrial sector and the local virtual license manager of the second industrial sector, without requiring the intervention other elements of the second industrial sector. Several license managers can thus be placed in contact, these being exclusively responsible for the management of licenses.

In a preferred embodiment, the exchange of the license request-response pair includes verification of the license sent and/or of the service application's delegation policy, the verification being implemented by at least one among the first secure connector and the second secure connector.

This makes it possible to guarantee that the license and/or the delegation policy has indeed been provided to the second industrial sector, which increases the level of security of the method. It is thus possible to improve the configuration of a system for managing licenses for a service application that is provided to an industrial sector, as well as license monitoring, control, and tracking over time.

In a preferred embodiment, the deployment of the local virtual license manager comprises a prior downloading of a virtual machine into the second industrial sector from the first industrial sector, the local virtual license manager being deployed by said virtual machine.

This makes it possible to limit the number of operations implemented by the first industrial sector, since once the communication channel has been created, the first industrial sector only has to provide the virtual machine and any license updates to the second industrial sector.

This thus also limits data traffic and returned information, for example license verification requests, which reduces latency times. This also allows remote deployment of the service application while retaining their control.

Herein, a virtual machine is a virtualized function configured to be installed on or removed from a network component of an industrial sector, for example a node of a network infrastructure of this industrial sector, in particular a computer server.

Herein, deployment of a local virtual license manager is equivalent to an instantiation, the local virtual license manager corresponding here to a VNF function. Such an instantiation therefore includes a copy, in the second industrial sector, of an original license manager located outside the second industrial sector, for example in the first industrial sector, and on the basis of content of the virtual machine.

In one possible embodiment, the downloading of the virtual machine is implemented via the communication channel configured between the first secure connector and the second secure connector. In particular, the virtual machine is installed into the second industrial sector from the second secure connector.

Alternatively, the deployment of the local virtual license manager comprises a prior downloading of a container into the second industrial sector from the first industrial sector, the local virtual license manager being deployed by said container.

Herein, a container is a logical or physical entity capable of holding information, and in particular configured to encapsulate software components. Optionally, such a container defines an execution environment for said software components, which allows for example monitoring them, instantiating them, or managing their interactions with other entities or other functions.

In a preferred embodiment, the method further comprises a locking, uninstalling, or destruction of the virtual machine.

Preferably, said locking, uninstalling, or destruction is implemented when at least one among the delegation policy and the communication channel is discontinued.

Alternatively, said virtual machine is the container previously downloaded into the second industrial sector from the first industrial sector.

This makes it possible to discontinue a delegation or a communication channel established between two industrial sectors when one or more collaboration conditions are not met, for example when a cyber-physical system to be controlled by means of the application service is not available or is out of service, when the secure connectors are not in compliance with what is desired, when one of the industrial sectors does not have a sufficient level of security, etc.

In general, this also allows providing protection against the copying or duplication of the virtual machine or container by a third party who is not authorized to do so, for example a third party who does not have the associated license.

In a preferred embodiment, the method further comprises a counting of:

a number of local virtual license managers deployed from the first industrial sector into the second industrial sector; and/or a number of licenses for the service application that are sent from the first industrial sector to the local virtual license manager.

Preferably, the local virtual license managers for which a number is counted include the local virtual license managers deployed from the first industrial sector into the second industrial sector via the secure communication channel.

According to this embodiment, at least two separate licenses are sent to one or more local virtual license managers deployed in the second industrial sector. Examples of separate licenses are licenses for the same service application but defined using different rules or parameters, or licenses for different service applications.

Advantageously, the sending, and therefore the implementation, of a plurality of separate licenses makes it possible to count them for control purposes.

One can thus for example count the number of licenses sent during a predetermined period of time, the number of deployments of virtual machines (or containers), these virtual machines being able to be downloaded into the second industrial sector from the first industrial sector prior to the sending of each license. It is also possible to count the number of updates of the local virtual license manager, when these updates are implemented by each downloaded virtual machine.

In one possible embodiment, the method comprises a counting of the previous downloads of the virtual machine into the second industrial sector from the first industrial sector, the local virtual license manager being deployed by said virtual machine.

In one possible embodiment, the method further comprises a counting of a number of locks, uninstalls, or destructions of the virtual machine when at least one among the delegation policy and the communication channel is discontinued.

It is thus possible to know, at any time, the number of local virtual license managers deployed, of service application licenses sent, and of virtual machines previously downloaded, locked, uninstalled, and/or destroyed in the second industrial sector.

In a preferred embodiment, the first and the second industrial sector is a multi-access edge computing network.

As used herein, a multi-access edge computing (MEC) network is a particular type of industrial sector. The ETSI™ (European Telecommunications Standards Institute) group has defined precise technical specifications relating to network architectures compatible with the standards of multi-access edge computing. According to these technical specifications, a MEC network is configured to host service applications at a location very close to the user ("end user") and/or to terminals external to the system. This makes it possible to store and process data with a faster response time than traditional infrastructures and networks.

In addition, a MEC network is designed to be physically and directly installed at different locations of an operator-provided network, and for example in or near base stations, or in infrastructures belonging to specific users or industries.

The data collected or used from these users and industries enable the deployment of Industry 4.0 network services on infrastructures connected to heterogeneous cloud networks, i.e. based on different access technologies and different types of distributed resources. Herein, an edge network may be a cloud network.

Given that the architecture of MEC networks defines a data exchange and control space providing industries with greater flexibility in pooling their resources, MEC networks make it possible to considerably improve data sharing and the management of service application licenses at an industrial site.

According to another object of this development, an industrial data server is proposed for controlling licenses for a service application that are managed across a plurality of interconnected industrial sectors, said server being arranged to be connected to an industrial sector among said plurality of industrial sectors and configured to implement steps of the method according to any one of the above embodiments.

In one possible embodiment, the industrial data server is configured to implement:

the selection of the delegation policy for delegating the service application to the second industrial sector among the plurality of industrial sectors; and/or the configuration, according to the selected delegation policy, of the communication channel between the first secure connector of the first industrial sector and the second secure connector of the second industrial sector.

In one possible embodiment, the industrial data server is configured to implement:

the deployment, into the second industrial area and via the secure communication channel, of the local virtual license manager; and the sending of the license for the service application to said local virtual license manager, the license authorizing the use of the service application by the second industrial sector.

In one possible embodiment, the first industrial sector comprises the industrial data server or is connected to the industrial data server.

According to another object of the development, a computer program is proposed comprising instructions for implementing the method according to one of the embodiments of the first object, when said instructions are executed by a processor of a computer processing circuit.

According to yet another object of the development, an information storage medium is proposed, removable or non-removable, partially or entirely readable by a computer or a processor, comprising code instructions of a computer program for executing each of the steps of the method according to any one of the embodiments of the first object.

BRIEF DESCRIPTION OF DRAWINGS

Other features, details, and advantages will become apparent upon reading the detailed description below, and upon analyzing the appended drawings, in which.

Unless otherwise indicated, similar or common elements in multiple figures bear the same reference labels and have identical or similar characteristics; therefore these common elements are generally not described again for simplicity's sake.

DESCRIPTION OF EMBODIMENTS

The drawings and the following description contain elements that for the most part are certain in nature. Therefore they may be used to provide a better understanding of this disclosure and to contribute to its definition, where appropriate.

Figure 1:
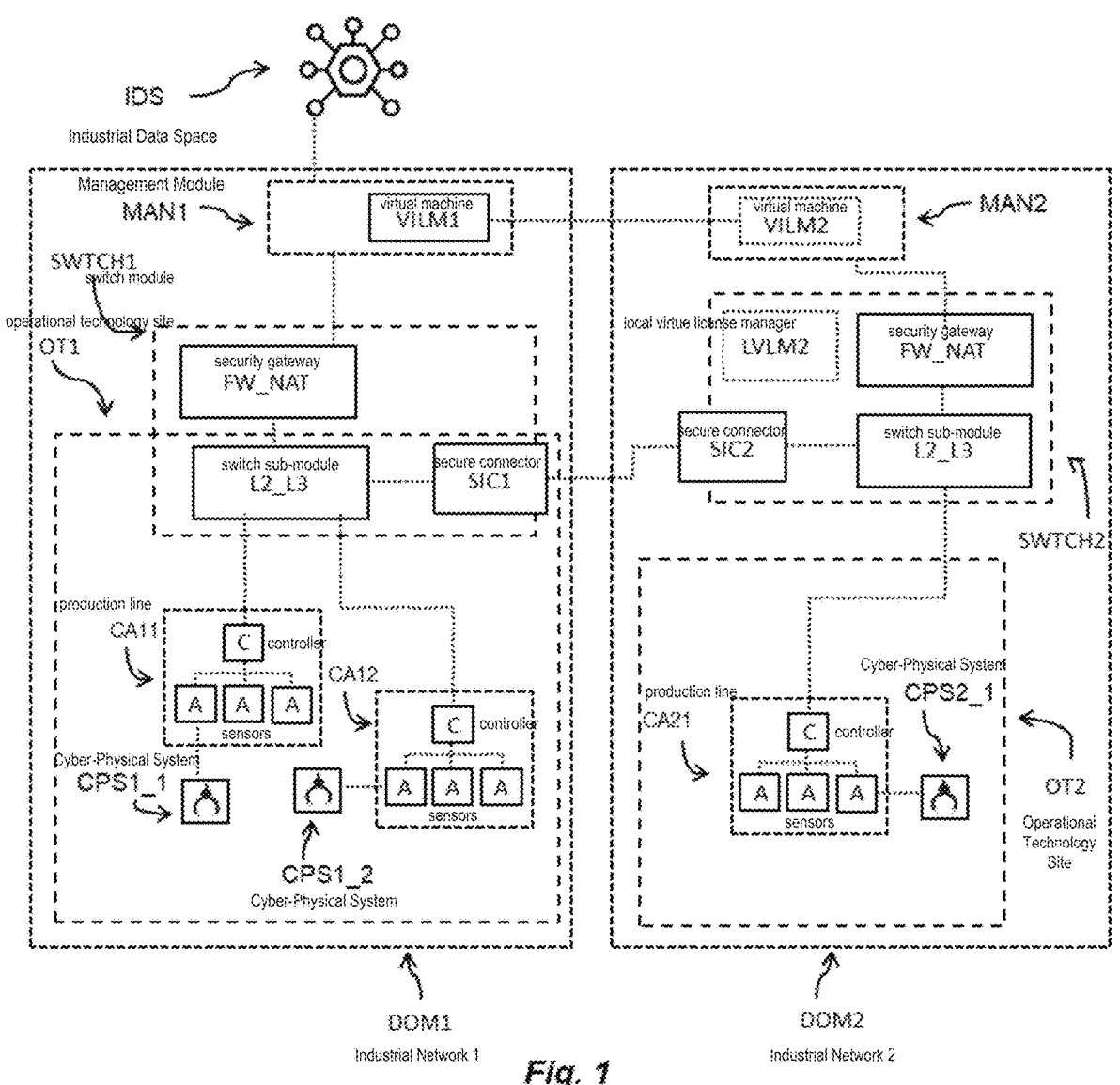
FIG. 1 represents a schematic view of an exemplary connection between two industrial sectors, according to one embodiment.

Reference is now made to FIG. 1, which shows an example of the architectures of interconnected industrial sectors that are adapted to enable license management of one or more service applications as described below.

Herein, the terms "industrial sector" and "architecture" are used interchangeably. The terms "industrial sector" and "MEC sector" are used interchangeably in the case where an industrial sector is formed by an architecture specific to a multi-access edge computing network.

At least one of the two industrial sectors DOM1 and DOM2 is linked or connected to an industrial data space IDS. The industrial data space IDS comprises, for example, a cloud network, and allows providing software or service applications.

In various examples, the industrial data space IDS is an industrial data server, said industrial data server being linked to the first industrial sector DOM1, being comprised in the first industrial sector DOM1. The first industrial sector DOM1 may also be composed of said industrial data server IDS.

As illustrated, the industrial data space IDS is directly linked to the first industrial sector DOM1 via a management module MAN1 of DOM1, this management module being for example a multi-access edge platform module if the sector DOM1 is a multi-access edge computing network.

The sectors DOM1 and DOM2 are linked or interconnected by at least one inter-sector interface, for example via a connection between management module MAN1 and a management module MAN2 of DOM2, this connection possibly being established in particular between instances VILM of virtual functions of these same management modules.

If each of the sectors DOM1 and DOM2 is a multi-access edge computing network, the management modules MAN1 and MAN2 are preferably service modules specific to the architecture of the MEC sectors.

The service application(s) are here intended for executing commands of a cyber-physical system CPS, for example to control a robot of such a cyber-physical system, and is/are provided by an industrial data space IDS, also called client space, and to which the first sector DOM1 has access.

In general, the industrial data space IDS also allows control and analysis of data provided by the industrial sectors DOM1 and DOM2. This control and data analysis is preferably governed by the rules of Industry 4.0 for Big Data processing. The industrial data space IDS is configured so that DOM1 and DOM2 depend on the same industrial governance rules.

As described below, these governance rules may include inter-sector collaboration rules, rules for implementing delegation policies, rules for creating secure inter-sector communication channels, license management implementation rules, etc.

In particular, the rules defined by the industrial data space IDS authorize the second industrial sector DOM2 to call upon the first industrial sector DOM1 in the context of a lease or a remote use of a cyber-physical system.

The industrial data space IDS is, for example, operated by a third party distinct from the operators of the industrial sectors DOM1 and DOM2. The industrial data space IDS is, for example, a provider of service applications and/or an entity that owns software for controlling cyber-physical systems.

In particular, the industrial data space IDS wishes to implement the leasing of a cyber-physical system CPS1_1 or CPS1_2 which is operated by the first industrial sector DOM1.

The first industrial sector DOM1 comprises an operational technology (OT) site, here OT1, for example a first production line; this operational technology site OT1 may be connected to an industrial IT network (IT the acronym for "Information Technology") comprising a cloud network, a wired network, etc.

Similarly, the second industrial sector DOM2 comprises an operational technology site OT2, for example a second production line which is parallel to OT1 but not connected thereto. This second production line OT2 may also be connected to an industrial IT network.

In the example shown here, the inter-sector interface between sectors DOM1 and DOM2 is implemented preferably between a switch module SWTCH1 of DOM1 and a switch module SWTCH2 of DOM2. Inter-sector interfaces may also be implemented between the production sectors OT1 and OT2.

If the industrial sectors DOM1 and DOM2 are multi-access edge computing networks, the switching modules SWTCH1 and SWTCH2 are preferably platform management modules specific to the architecture of the MEC sectors.

Generally, each of the switch modules SWTCH1 and SWTCH2 comprises a switch sub-module L2_L3, which includes an Ethernet L2 switch, called the L2 bridge, and an IP routing switch, called the L3 bridge. The L2 bridge allows Ethernet data packets to be sent according to their destination MAC address. The L3 bridge allows data packets to be sent according to their destination IP address, and has one or more non-Ethernet interfaces, for example SONET/SDH, ATM, etc.

Each of the switching modules SWTCH1 and SWTCH2 further comprises a security sub-module FW_NAT, also called a security gateway, which is connected to the switching sub-module L2_L3 and which includes a firewall FW as well as a network address translator NAT. The switching modules SWTCH1 and SWTCH2 may additionally comprise other sub-modules separating the OT production sector from the IT industrial sector or network by one or more other security gateways.

Each of the switching modules SWTCH1 and SWTCH2 further comprises a secure connector, SIC1 or SIC2, which define a connection end of the industrial sectors DOM1 and DOM, and between which an interface can be established. In particular, this interface may be a secure communication channel created according to the method described herein.

The operational technology site OT1 of DOM1 further comprises two parallel production lines CA11 and CA12, each of these production lines enabling the control of cyber-physical systems of the same type. For example, these are cyber-physical system CPS1_1 controlled by production line CA11 on the one hand and cyber-physical system CPS1_2 controlled by production line CA12 on the other hand.

The operational technology site OT2 of DOM2 here comprises a single production line CA21 enabling the control of another cyber-physical system CPS2_1, of the same type as cyber-physical systems CPS1_1 and CPS1_2.

This configuration of operational technology sites can be generalized to other variants of production lines divided into sites OT1 and OT2, for example two production lines in OT1 and two production lines in OT2, etc.

In the example presented here, each of the production lines CA11, CA12, and CA21 comprises a controller C, also called master controller, and a plurality of sensors A, also called sensor-actuators. At least one among the plurality of sensors A is connected to cyber-physical system CPS1_1 and to cyber-physical system CPS1_2. Controlling an action of one of the cyber-physical systems corresponding to a given production line is typically done by means of an associated C2D (or "Controller to Device") interface, configured to interface the controller C with the sensors A of said production line.

Cyber-physical systems of the same type require the use of software or a service application, this software or service application possibly provided by different sources. In the present case, the service application is provided by the industrial data space IDS, and can be accessed or used by different principals, here two distinct principals, one corresponding to the first industrial sector DOM1 and the other corresponding to the second industrial sector DOM2. However, the principal corresponding to the second industrial sector DOM2 may not be authorized to use this service application while the principal corresponding to the first industrial sector DOM1 may be so authorized. It is then appropriate here to allow the second sector DOM2 to perform tasks by means of cyber-physical systems by providing it with a license authorizing the lease or use of these cyber-physical systems.

As detailed below, the management method according to any one of the embodiments and examples described herein provides for implementing a deployment of a local virtual license manager LVLM2, from the first industrial sector DOM1 into the second industrial sector DOM2, and via a secure communication channel established between the secure connectors SIC1 and SIC2.

Preferably, this local virtual license manager LVLM2 is deployed in the switching module SWTCH2 of the second industrial sector DOM2.

In particular, and as illustrated, this deployment follows the downloading, in manager MAN2, of a dedicated virtual machine VILM2. The downloading is performed here from the first industrial sector DOM1, for example based on a first virtual machine VILM1 previously deployed in manager MAN1 of the first industrial sector DOM1.

This makes it possible to minimize the excess traffic and the latency times induced by the rights management, this rights management having for example been required by the deployment of virtual machine VILM1 into the first sector DOM1.

Figure 2:
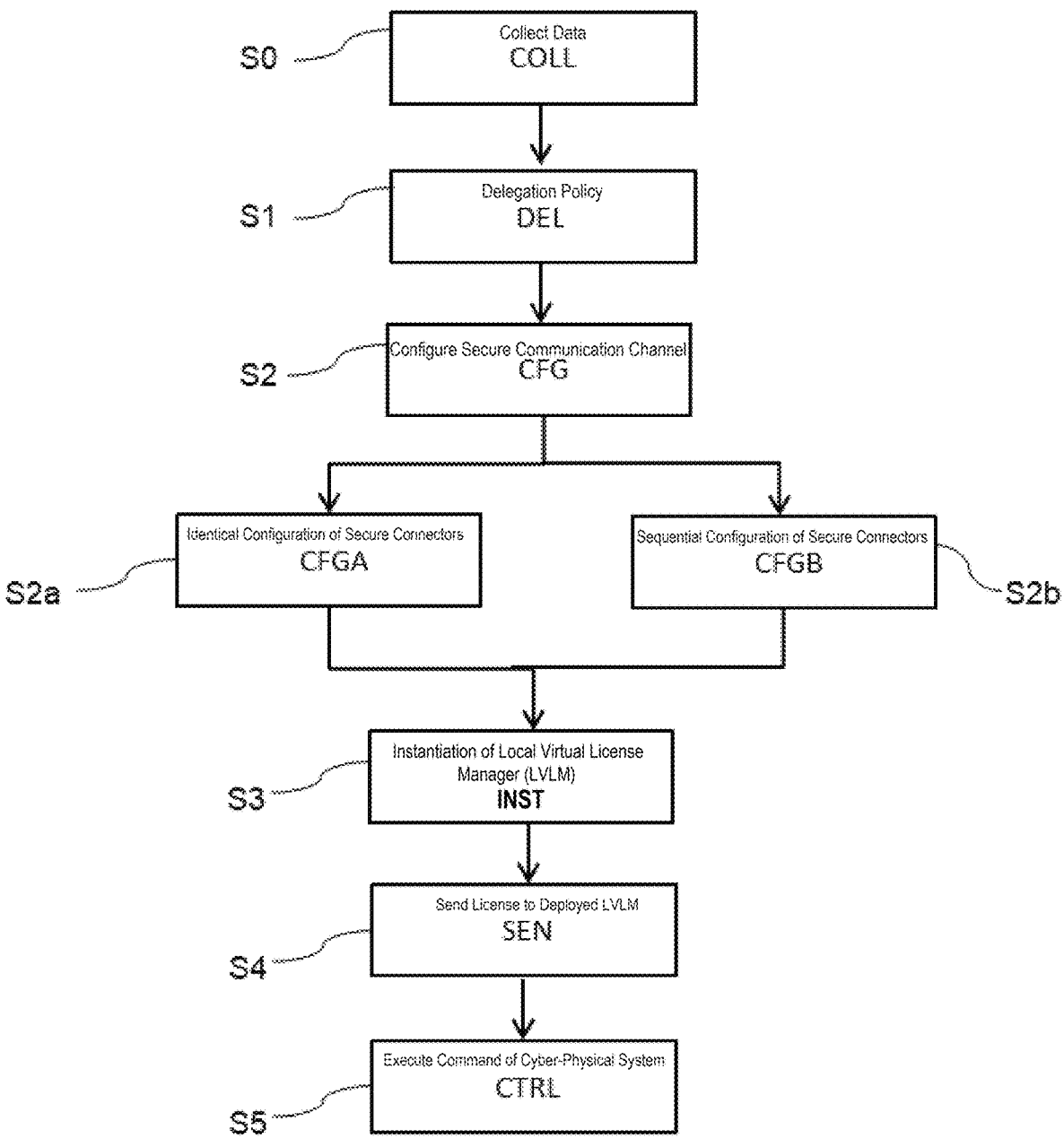
FIG. 2 represents, in the form of a flowchart, the steps of a method for managing licenses across two industrial sectors, according to one embodiment.

Reference is now made to FIG. 2, which illustrates, in flowchart form, an example of steps S0, S1, S2, S2a, S2b, S3, S4, and S5 of a method for managing licenses for a service application.

These steps provide for implementing a collaborative license management across two industrial sectors DOM1 and DOM2, according to the selection of a delegation policy for this service application.

An optional preliminary step S0 comprises the establishment of a collaboration agreement between the two industrial sectors DOM1 and DOM2.

For example, the preliminary step S0 comprises a sub-step of identifying cyber-physical systems present in an industrial sector, a sub-step of locating modules in this industrial sector, or a sub-step of identifying licenses or license management constraints for service applications associated with these cyber-physical systems. The preliminary step S0 may also implement the collection of data originating from the first industrial sector DOM1: from the industrial data space or from an industrial data server IDS.

In addition, the preliminary step S0 may also comprise a sub-step of locating a service application or a copy thereof. In particular, the industrial data space IDS may indicate to the industrial sector DOM1 the location of a compatible service application for executing a command with a particular cyber-physical system, or an address where this application is located, for example a MAC or IP address.

In addition, the preliminary step S0 may also comprise a sub-step of supplying a service application to the industrial sector DOM1. In particular, this may involve downloading or installing certain parts of the service application from the IDS to DOM1, and possibly to DOM2 via an interface already established between DOM1 and DOM2. Copying, downloading, or installing portions of the service application may further be subject to permission provided by the IDS.

In addition, the preliminary step S0 may also comprise a sub-step of verifying the infrastructure of the first industrial sector DOM1, which itself may verify the infrastructure of the second industrial sector DOM2 when DOM1 and DOM2 are interconnected by means of an interface. If any of these infrastructures do not comply with predetermined conditions, the subsequent steps may not be implemented.

Step S1 concerns the selection of a service application delegation policy in the second industrial sector DOM2.

During this step S1, the first industrial sector DOM1 indicates to the second industrial sector DOM2 which delegation method to apply, for example according to the governance rules in force or for the purpose of accessing or using a cyber-physical system.

Typically, governance policies are associated with each industrial sector, these being dependent for example on Industry 4.0 rules, rules in accordance with general data protection regulations, the geographical area or the country where the industrial sector is located, the owner(s) of the data used by the industrial sectors, the types of cyber-physical systems that these industrial sectors include, the types of virtual functions used by them, their providers, etc.

Step S1 may further comprise a sub-step of verifying the capabilities or compliance of the infrastructure of the second industrial sector DOM2 for implementing the delegation and subsequently accessing or using a cyber-physical system of the first industrial sector DOM1.

Step S2 concerns a configuration of a secure communication channel between the first industrial sector DOM1 and the second industrial sector DOM2, and in particular between a first secure connector SIC1 of DOM1 and a second secure connector SIC2 of DOM2. Step S2 comprises the creation of said secure communication channel if said channel was not previously established.

The creation and/or configuration of such a secure communication channel includes setting up secure connectors SIC1 and SIC2. Such an implementation may follow a verification of the capabilities or compliance of the infrastructure of the first industrial sector DOM1 and/or of the second industrial sector DOM2.

The configuration included in step S2 is implemented in such a way as to provide an appropriate communication channel for the management and sharing of licenses between DOM1 and DOM2.

This makes it possible, for example, to determine the speed, latency, and/or level of security of the secure connectors SIC1 and SIC2 so as to adapt them for downloading into DOM2, a dedicated virtual machine VILM2 or alternatively a dedicated container, and to do so from the first industrial sector DOM1, or indirectly from the industrial data space or an industrial data server IDS.

The configuration of the secure connectors SIC1 and SIC2 further comprises the assignment of collaboration parameters. For example, secure connector SIC1 receives one or more parameters defining the delegation policy selected during step S1, and/or activatable functions useful for the communication or collaboration of the first industrial sector DOM1 with the second industrial sector DOM2.

According to a first possible variant of step S2, called step S2a, the secure communication channel is established between sectors DOM1 and DOM2 by means of secure connectors SIC1 and SIC2, which are configured identically.

For example, the two secure connectors SIC1 and SIC2 are deployed simultaneously and/or from the same source. In the event of an update, the two secure connectors SIC1 and SIC2 are configured identically from the management module MAN1 of the first industrial sector DOM1.

According to a second possible variant of step S2, called step S2b, the first secure connector SIC1 is deployed prior to the second secure connector SIC2. A secure communication channel is then established from the first industrial sector DOM1 to the second industrial sector DOM2, and the second secure connector SIC2 which serves as an end of the communication channel in DOM2 is then updated by the first secure connector SIC1. This updating of SIC2 comprises, for example, the providing of delegation parameters, secure identifiers, or functions that can be activated in the second industrial sector DOM2.

In particular, and if not initially present, the second secure connector SIC2 is deployed in the second industrial sector DOM2 from the first secure connector SIC1, and configured so as to allow sending data between the two industrial sectors DOM1 and DOM2.

Step S3 concerns a deployment, in the second industrial sector DOM2, of a local virtual license manager LVLM2 by means of the previously configured secure communication channel.

In particular, step S3 comprises downloading a dedicated virtual machine VILM2, or alternatively a dedicated container, through the secure communication channel created between SIC1 and SIC2 during the preceding step. Preferably, this downloading is carried out in the management module MAN2 of the second industrial sector DOM2.

In addition, the downloading in step S3 is followed by an instantiation, from the downloaded virtual machine or the downloaded container, of the local virtual license manager LVLM2 in the second industrial sector DOM2.

According to various alternatives, this instantiation may be performed by first installing an operating system and/or the virtual machine VILM2 from the first industrial sector DOM1. The virtual machine VILM2 can then be executed in the second industrial sector DOM2 in order to instantiate the local virtual license manager LVLM2, preferably in the switch module SWTCH2 of DOM2.

In addition, step S3 may comprise a verification of the downloaded virtual machine before instantiating the local virtual license manager LVLM2. Several instances of local virtual license managers may also be deployed by repeating the operation, in which case each instance is preferably distinguished by means of a unique identifier, for example a number generated during each instantiation.

Step S3 thus comprises the creation, in the second industrial sector DOM2, of at least one instance of the local virtual license manager LVLM2.

Optionally, this instantiation is determined by the first industrial sector DOM1 or by the industrial data space IDS, for example on the basis of an instantiation agreement for the local virtual license manager LVLM2 in DOM2 when the inter-sector communication channel between SIC1 and SIC2 is compliant for license management.

Optionally, the configuration in step S2 and/or the deployment in step S3 is stopped if the delegation is discontinued, this stoppage possibly including the closure of the secure communication channel between the secure connectors SIC1 and SIC2, if the secure communication channel has already been established.

In this case, when the configuration and/or deployment is discontinued, the instance of the local virtual license manager LVLM2 can also lock itself, for example by deleting the associated keys required to access or use the local virtual license manager LVLM2, uninstall itself or self-destruct if it has already been deployed.

According to different examples, the virtual machine or container may also lock itself, uninstall itself, or self-destruct. Advantageously, this makes it possible to avoid any copying of the virtual machine or the container. For example, the distinction of different instances by means of identifiers can be used to detect any attempt at duplication, and thus control the number of instances by means of the local virtual license manager.

Step S4 concerns the sending of a license from the first sector DOM1 to the deployed local virtual license manager LVLM2. The sending of licenses across industrial sectors is intended to authorize the access to or use of service applications by the second industrial sector DOM2.

According to different alternatives, a license may be sent separately to the first secure connector SIC1 and to the second secure connector SIC2, or to both secure connectors SIC1 and SIC2. Only certain licenses may be provided to one or the other of the secure connectors, for example to establish a specific communication between DOM1 and DOM2 for certain types of service applications, for which each of the two secure connectors SIC1 and SIC2 must have corresponding licenses.

Step S5 relates to a command of a cyber-physical system, and in particular to the execution of a command of a cyber-physical system comprised in the first industrial sector DOM1, from the second industrial sector DOM2.

For example, a command of the cyber-physical system CPS1_1 or CPS1_2 may be implemented by means of the service application for which the license was sent to the second industrial sector DOM2 during step S4, following deployment of the local virtual license manager LVLM2 during step S3, this deployment having been carried out via the secure communication channel configured during step S2, on the basis of the delegation policy selected during step S1.

Preferably, the command traffic of the cyber-physical system travels between the second industrial sector DOM2 and the first industrial sector DOM1 via the secure communication channel configured between SIC1 and SIC2. This makes it possible in particular for the secure connectors SIC1 and SIC2 to verify the command traffic.

Figure 3:
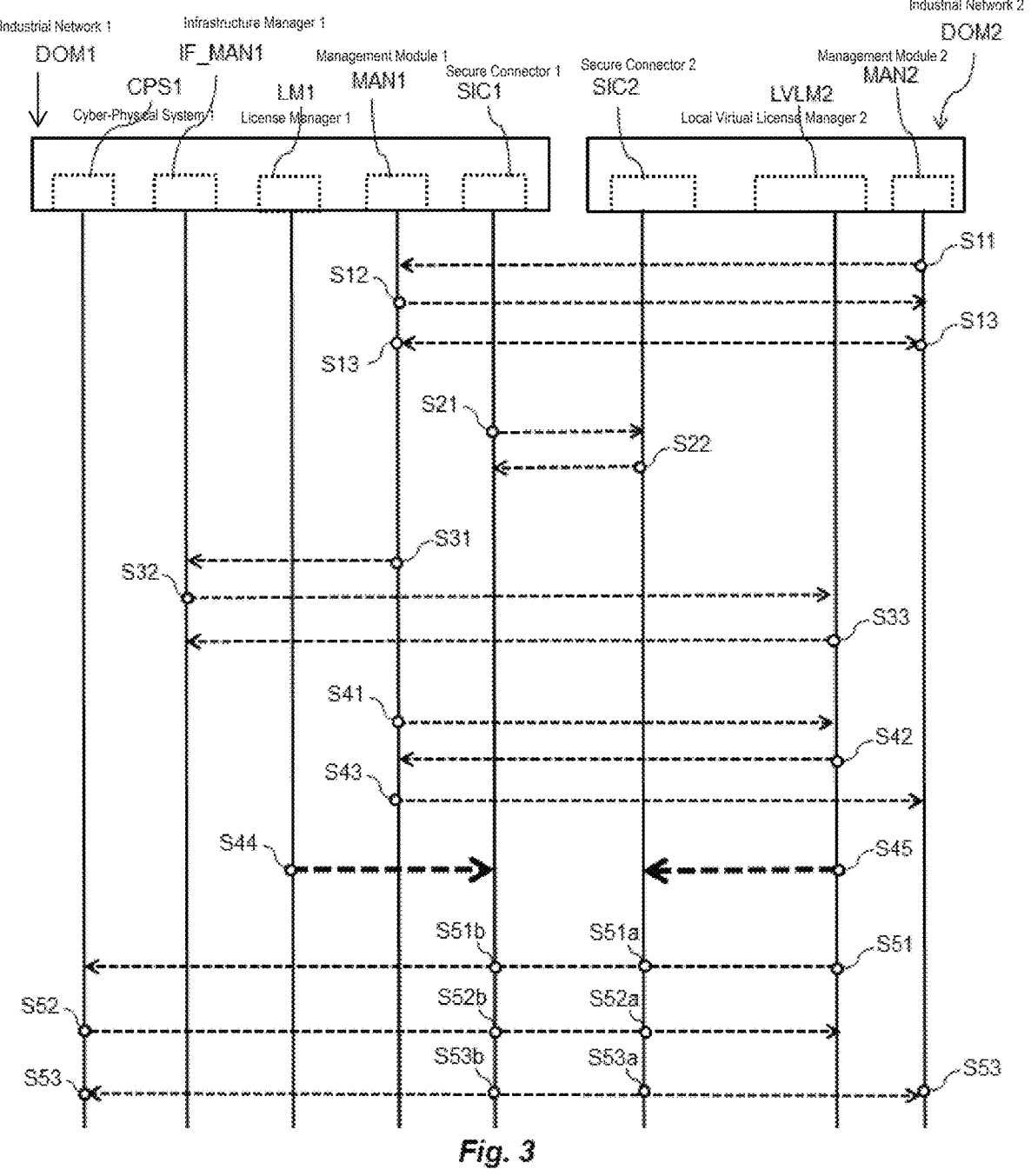
FIG. 3 represents, in the form of a flowchart, the steps of a method for managing licenses according to one embodiment.

Reference is now made to FIG. 3, which shows a flowchart detailing the sub-steps of the method for managing licenses.

In particular, the flowchart represented illustrates an example of a management method comprising sub-steps S11 to S53$b$, during which traffic is exchanged between the entities of the first industrial sector DOM1 and the entities of the second industrial sector DOM2. The traffic exchanged may be data traffic, application traffic, and/or command traffic.

In connection with the steps described above, the selection step S1 comprises sub-steps S11 to S14, the configuration steps S2, S2$a$, and/or S2$b$ comprise sub-steps S21 to S22, the deployment step S3 comprises sub-steps S31 to S33, the sending step S4 comprises sub-steps S41 to S43 and optionally sub-step S44 and/or sub-step S45, and the step S5 of executing a command of the cyber-physical system comprises substeps S51 to S53$b$.

As illustrated, the first industrial sector DOM1 here comprises at least one cyber-physical system CPS1. The first industrial sector DOM1 further comprises management module MAN1 and, once created or configured, secure connector SIC1. The first industrial sector DOM1 further comprises an infrastructure manager IF_MAN1 and a license manager LM1.

The second industrial sector DOM2 comprises another management module MAN2 and, once created or instantiated, secure connector SIC2 as well as local virtual license manager LVLM2.

During sub-step S11, a delegation request is sent from management module MAN2 of DOM2 to management module MAN1 of DOM1.

Upon receiving this request, management module MAN1 initiates a delegation request for a service application associated with the cyber-physical system, in order to allow the second sector DOM2 to use functions of the first sector DOM1. This delegation request may possibly depend on a delegation policy already configured or implemented at the local level.

During sub-step S12, an acknowledgment message corresponding to the request of sub-step S11 is sent back to management module MAN2 of the second industrial sector DOM2, to confirm that delegation can be implemented, and in particular a selection of a delegation policy.

This acknowledgment message may also include a request configured to verify that the infrastructure of the second industrial sector DOM2 is compatible with instantiation of a local virtual license manager, i.e. that it can support downloading a virtual machine or a container enabling the instantiation of such a local virtual license manager, in particular the local virtual license manager LVLM2.

For example, if the infrastructure of the second industrial sector DOM2 does not include a hardware security module (or HSM), implementation of the download and/or instantiation may subsequently be refused. By default, it is assumed here that the infrastructure of the second industrial sector DOM2 is compatible with the following steps and sub-steps, in order to provide a signature confirming the possibility of creating a secure communication channel between DOM2 and DOM1.

During sub-step S13, any other message can be sent between MAN2 and MAN1, this other message comprising forexample a signature indicating that the infrastructure of DOM1 and/or DOM2 is available or is in compliance for implementing the delegation and/or for creating a secure communication channel between the two sectors. This other message may also trigger an update to the configuration of secure connector SIC2 if it is already deployed.

During sub-step S21, a secure communication channel is created between the secure connectors SIC1 and SIC2.

Optionally, sub-step S21 includes updating the configuration of the secure connectors and/or of the secure communication channel if the latter is already present. In particular, an updating of secure connector SIC2 may be implemented from secure connector SIC1, as described above in relation to sub-step S2b.

Optionally, this updating of the configuration of the secure connectors and/or of the secure communication channel includes an activation and/or an updating of dedicated functions accessible via SIC2, for example data management functions, so that the two secure connectors SIC1 and SIC2 have access to the same activated functions.

If the governance rules associated with sectors DOM1 and DOM2 allow the exchange of sensitive data, software, or functions, it is important that the communication channel established between the two has a sufficient level of security for this exchange. Thus, updating the configuration of the secure connectors may include a ban on hosting sensitive functions in the second industrial sector DOM2 if the level of security of its infrastructure is considered insufficient compared to that of the first industrial sector DOM1, or an authorization to host these sensitive functions if this level of security is sufficient.

Optionally, during sub-step S22, an acknowledgment message is sent from secure connector SIC2 to secure connector SIC1, this acknowledgment message confirming for example the end of the creation or configuration of the secure communication channel between the two or the end of the configuration update to SIC2.

During sub-step S31, and upon receiving the acknowledgment message corresponding to sub-step S13 or S22, management module MAN1 sends another acknowledgment message to the infrastructure manager IF_MAN1 of the first sector DOM1. This other acknowledgment message indicates that the secure communication channel is properly established, and informs of a request to the second sector DOM2 to instantiate the license manager.

During sub-step S32, possibly triggered by sub-step S31, the first industrial sector DOM1 implements the deployment of the local virtual license manager LVLM2 in the second industrial sector DOM2. In particular, sub-step S32 comprises a downloading, from the infrastructure manager IF_MAN1 of DOM1, of a virtual machine VILM2 (or of a container) into management module MAN2 of DOM2, and an instantiation, from this virtual machine VILM2 (or of this container), of the local virtual license manager LVLM2, which here is preferably a virtual function VNF suitable for managing licenses for the service application.

The installation of a corresponding operating system in the second industrial sector DOM2 may also be carried out in order to implement the instantiation of VILM2. Such an installation is not necessary here, which provides a method that is advantageously faster to implement since the first industrial sector DOM1 generally already has virtual machines and/or containers intended tobe downloaded and then executed in the second industrial sector DOM2.

Optionally, during sub-step S33, and when the local virtual license manager LVLM2 has been deployed in the second industrial sector, a corresponding acknowledgment message is sent from the local virtual license manager LVLM2 of DOM2 to the manager infrastructure IF_MAN1 of DOM1.

Preferably, following its instantiation in the second industrial sector DOM2, the local virtual license manager LVLM2 subscribes to the license manager LM1 present in DOM1. LM1 is configured to regularly update the licenses for the service application based on information provided to it, in particular from the industrial data space IDS. A subscription by LVLM2 to the license manager LM1 means that the latter can provide it with the updates for these licenses at any time.

For example, in the case where it is desired to deactivate the local virtual license manager LVLM2, the license manager LM1 can issue a request to this effect and intended for said LVLM2. On the basis of requests issued from the license manager LM1 to the local virtual license manager LVLM2, it is also possible to terminate or renew a license for a limited period, for example by supplying corresponding certificates or keys. The possibility of making such changes in license management can thus be implemented by means of a subscription request (not shown), provided that the license manager LM1 is connected to the local virtual license manager LVLM2.

During sub-step S41, possibly triggered by sub-step S33, at least one license for the service application is sent from the management module MAN1 to the local virtual license manager LVLM2 of DOM2, said at least one license being required for each service application one wishes to use.

Optionally, during sub-step S42, a corresponding acknowledgment message is sent from the local virtual license manager LVLM2 of DOM2 to management module MAN1, informing the latter that the license was properly received.

Optionally, during sub-step S43, a confirmation message may optionally be sent back from management module MAN1 of DOM1 to management module MAN2 of DOM2, this confirmation message making it possible to inform the second industrial sector DOM2 that the license manager LM1 is ready to implement further actions.

Advantageously, sub-steps S41, S42, and/or S43 also make it possible to carry out a possible count of the number of times licenses are sent.

Herein, it is possible that the local virtual license manager LVLM2 cannot be deployed in the second industrial sector DOM2, for example because DOM2 does not have the resources necessary for this deployment. However, alternatively, the inter-sector relations made possible due to the secure communication channel between secure connectors SIC1 and SIC2 may be sufficient for license management, provided that SIC1 and SIC2 are configured for this purpose, for example in terms of capacity, latency, and level of security.

During sub-steps S51 and S52, a request-response pair is exchanged between the local virtual license manager LVLM2 of the second industrial sector DOM2 and the first industrial sector DOM1 in order to obtain a license enabling the execution of a command of the cyber-physical system CPS1 by means of a service application specific to accessing or using the system. This license may be provided by the first industrial sector DOM1, or even by one of the secure connectors SIC1 and/or SIC2 if one or other of sub-steps S41 and S42 has been implemented.

For example, a request to provide this license is sent from LVLM2 to the cyber-physical system CPS1 via the secure communication channel during sub-step S52. In particular, this request travels through the communication channel established and configured between the two secure connectors SIC1 and SIC2. Optionally, this request may include a request for information on the type of license or service application needed to execute a command of CPS1.

Optionally, during sub-step S51a, a verification of the delegation policy or of parameters which have previously been provided to the second industrial sector DOM2, is implemented at the second secure connector SIC2. Additionally or alternatively, a similar verification may be implemented at the first secure connector SIC1 during sub-step S51b.

During sub-step S52, a response to the request of the previous sub-step S51 is sent from the cyber-physical system CPS1 to the local virtual license manager LVLM2 of the second industrial sector DOM2. In particular, this response travels through the secure communication channel and includes the license authorizing the second industrial sector DOM2 to access and use the service application to execute the command of the cyber-physical system CPS1.

Herein, the cyber-physical system CPS1 in principle knows the service application it requires to perform a task.

Optionally, during sub-step S52b, a verification of the license or of parameters which have previously been supplied to the second industrial sector DOM2 is implemented at the first secure connector SIC1. Additionally or alternatively, a similar verification may be implemented at the second secure connector SIC2 during sub-step S52a. A verification of the delegation policy of the service application may also be performed during at least one of sub-steps S52a and S52b.

Optionally, during sub-step S53, an acknowledgment message and/or a command request-response pair is sent between the two industrial sectors DOM1 and DOM2, and in particular between the cyber-physical system CPS1 of DOM1 and the management module MAN2 of DOM2.

The acknowledgment message of sub-step S53 makes it possible to confirm that the second industrial sector DOM2 does indeed have the license for the service application and/or that the cyber-physical system CPS1 of DOM1 is available for executing a remote command. The acknowledgment message may also indicate that the previous sub-steps have been implemented correctly.

The command request-response pair of sub-step S53 makes it possible to implement a command of the cyber-physical system, and to confirm that it has indeed been executed. For example, the request of the request-response pair may specify the use of a service application specific to CPS1 and/or may send it a command to be executed. The response of the request-response pair may confirm that the request was properly received or that the command was executed correctly.

Optionally, during sub-step S53b, an additional verification of the data or of the command traffic sent by means of the acknowledgment message and/or of the command request-response pair is implemented at the first secure connector SIC1. A similar verification may be implemented during sub-step S53a at the second secure connector SIC2. In particular, the license sent and/or the delegation policy of the service application are part of the data that can be verified.

Figure 4:
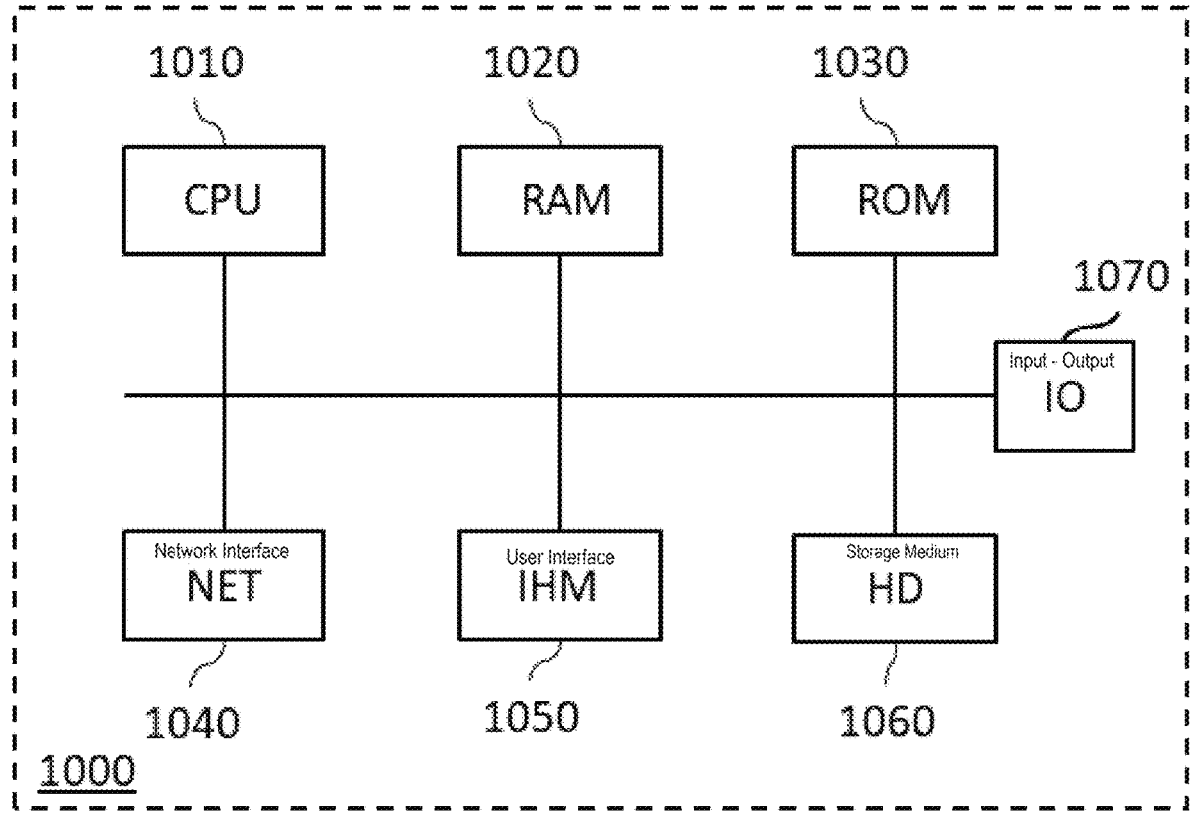
FIG. 4 represents a schematic block diagram of a computer processing circuit, according to one embodiment.

FIG. 4 shows a schematic block diagram of a computer processing circuit according to one exemplary implementation of the embodiments described.

According to one example, said computer processing circuit is a processor. Preferably, such a computer processing circuit is a system-on-chip 1000 arranged to implement a method for controlling an edge computing network.

In particular, this computer processing circuit may correspond to a hardware element defining or included in an industrial data server IDS or in one of the industrial sectors DOM1 and DOM2. When these industrial sectors are multi-access edge computing networks, these hardware elements are preferably platform modules or management modules of these networks.

In a non-limiting manner, the system-on-chip 1000 comprises communication bus connected, for example, to a central processing unit 1010 such as a processor or a microprocessor, and denoted CPU.

The system-on-chip 1000 further comprises a random access memory 1020, denoted RAM, able to store the executable code of the control method as well as the registers suitable for storing the variables and parameters necessary for implementing the method according to the embodiments, its memory capacity possibly supplemented by optional RAM memory connected to an expansion port, for example.

In addition, the system-on-chip 1000 comprises a read-only memory 1030, denoted ROM, for storing computer programs for implementing the embodiments described above, as well as a network interface 1040 which is normally connected to a communication network over which digital data to be processed is sent or received.

The network interface 1040 may be a single network interface or may be composed of a set of different network interfaces (for example wired and wireless interfaces or different types of wired or wireless interfaces).

Data packets are sent over the network's interface for transmission or are read from the network's interface for reception, under the control of application software running in the processor or microprocessor 1010.

Furthermore, the system-on-chip 1000 comprises a user interface 1050 for receiving inputs from a user or for displaying information to a user, an optional storage medium 1060 denoted HD, and an input-output module 1070, denoted IO, for receiving/sending data from or to external devices such as a hard disk, removable storage medium, or others.

In an example presented here, the executable code may be stored in read-only memory 1030, on the storage medium 1060, or on a digital removable medium such as a disc for example.

According to a variant, the executable code of the programs may be received by means of a communication network, via the network interface 1040, in order to be stored in the storage medium 1060 before being executed.

The central processing unit 1010 is suitable for controlling and directing the execution of instructions or software code portions of the program or programs according to one of the embodiments, instructions which are stored in one of the aforementioned storage means. After powering on, the CPU 1010 is able to execute instructions relating to a software application, stored in the main RAM memory 1020, after these instructions have been loaded from ROM for example.

In the example shown here, the system-on-chip 1000 is a programmable device that uses software. However, alternatively, this description may be implemented in any type of hardware (for example in the form of an application specific integrated circuit or ASIC).

The invention claimed is:

1. A method of managing licenses for a service application across a plurality of interconnected industrial networks, wherein the service application is configured to control a cyber-physical system in a first industrial network, the method being implemented by a computer processing circuit, the method comprising:

the computer processing circuit selecting, with the first industrial network among the plurality of industrial networks, a policy for delegating the service application to a second industrial network among the plurality of industrial networks;

the computer processing circuit deploying from the first industrial network into the second industrial network, a local virtual license manager comprising:

setting a secure communication channel between a first secure connector of the first industrial network and a second secure connector of the second industrial network, configuring the secure communication channel, according to the selected delegation policy, with the secure communication channel, downloading of a virtual machine into the second industrial network from the first industrial network, instantiating the local virtual license manager in the virtual machine; and the computer processing circuit sending a license for the service application from the first industrial network to the local virtual license manager, the license authorizing the execution of the service application by the second industrial network to control the cyber-physical system, wherein the first and second industrial networks are each a multi-access edge computing network.

2. The method according to claim 1, wherein the sending of the license for the service application to the local virtual license manager includes providing the license to the first secure connector and/or to the second secure connector.

3. The method according to claim 1, wherein a configuration of the secure communication channel includes an updating of the second secure connector relative to the first secure connector.

4. The method according to claim 1, the method further comprising, upon reception of the license by the local virtual license manager, executing a command of the cyber-physical system by means of the service application.

5. The method according to claim 4, wherein the execution of the command of the cyber-physical system is implemented in an exchange, between the first industrial network and the local virtual license manager of the second industrial network, of a license request-response pair.

6. The method according to claim 5, wherein the exchange of the license request-response pair includes verification of the license sent and/or of the delegation policy for the service application, the verification being implemented by at least one among the first secure connector and the second secure connector.

7. The method according to claim 1, further comprising a locking, uninstalling, or destruction of the virtual machine.

8. The method according to claim 1, wherein the method further comprises a counting of:

a number of local virtual license managers deployed from the first industrial network into the second industrial network; and/or a number of licenses for the service application that are sent from the first industrial network to the local virtual license manager.

9. An industrial data server for controlling licenses for a service application managed across a plurality of interconnected industrial networks, the server being arranged to be connected to an industrial network among the plurality of industrial networks and configured to implement the method according to claim 1.

10. A computer processing circuit comprising a processor and a memory, the memory storing program code instructions of a computer program that implements the method according to claim 1, when the computer program is executed by the processor of the computer processing circuit.

11. A non-transitory information storage medium, removable or non-removable, partially or entirely readable by a computer or a processor, comprising code instructions of a computer program stored thereon that, when executed, performs the method according to claim 1.

12. The method according to claim 1, wherein the selected delegation policy comprises data representing a set of rules defining remote access to the service application, the rules of the set of rules comprising one of data representing a delegation protocol associated with this delegation policy, a priority of use, a configuration constraint, a delegation duration, a network connectivity constraint, or a security parameter.

* * * * *